(12) United States Patent
Reimler (10) Patent No.: US 7,708,510 B2
(45) Date of Patent: May 4, 2010

(54) FASTENER SYSTEM, FASTENER SYSTEM ARTICLE, AND METHOD

(76) Inventor: James L. Reimler, 7125 Fairhill Pl., Charlotte, NC (US) 28270

( * ) Notice: Subject to any disclaimer, the term of this patent is extended or adjusted under 35 U.S.C. 154(b) by 141 days.

(21) Appl. No.: 11/935,872

(22) Filed: Nov. 6, 2007

(65) Prior Publication Data

US 2009/0116930 A1 May 7, 2009

(51) Int. Cl.
*F16B 39/00* (2006.01)

(52) U.S. Cl. .............. 411/166; 411/169; 411/172; 411/372.2; 411/373; 411/377; 411/429; 411/955; 411/978; 411/996; 411/999; 24/455; 24/457; 24/458

(58) Field of Classification Search .......... 411/107, 411/110, 116, 122–124, 166, 169, 172, 190, 411/191, 315, 321, 372.5, 373, 374, 401, 411/955, 965, 999, 103, 352, 377, 429, 431, 411/910, 978, 991–996; 24/455, 457, 458; 70/58, 229–232, DIG. 57
See application file for complete search history.

(56) References Cited

U.S. PATENT DOCUMENTS

| | | | | | |
|---|---|---|---|---|---|
| 821,471 | A | * | 5/1906 | Dewett et al. | 411/141 |
| 826,584 | A | * | 7/1906 | Lehman, I. | 411/133 |
| 1,261,646 | A | * | 4/1918 | Taber | 411/321 |
| 1,429,117 | A | * | 9/1922 | Thomas | 411/533 |
| 2,106,278 | A | * | 1/1938 | Redmer | 411/81 |
| 2,154,655 | A | * | 4/1939 | Bahan | 411/352 |
| 2,261,369 | A | * | 11/1941 | Henry et al. | 411/554 |
| 2,329,688 | A | * | 9/1943 | Bedford, Jr. | 52/718.03 |
| 2,371,595 | A | * | 3/1945 | Nield | 411/263 |
| 2,486,670 | A | * | 11/1949 | Nigg et al. | 411/551 |
| 3,152,507 | A | * | 10/1964 | Wieber | 411/405 |
| 3,295,579 | A | * | 1/1967 | Medal | 411/140 |
| 3,308,587 | A | * | 3/1967 | Gilroy et al. | 52/126.5 |
| 3,430,674 | A | * | 3/1969 | Forbush | 411/107 |
| 3,451,456 | A | * | 6/1969 | Dey | 411/166 |
| 3,602,284 | A | * | 8/1971 | Smith et al. | 411/352 |
| 3,731,961 | A | | 5/1973 | Becker | |
| 3,930,388 | A | | 1/1976 | Barras | |
| 4,034,788 | A | | 7/1977 | Melone | |
| 4,557,631 | A | | 12/1985 | Donan, Jr. et al. | |
| 4,618,300 | A | * | 10/1986 | Goebel | 411/433 |
| 4,737,057 | A | | 4/1988 | Olsson | |
| 4,938,644 | A | * | 7/1990 | Runels | 411/132 |
| 4,974,274 | A | | 12/1990 | Compton et al. | |
| 4,983,084 | A | | 1/1991 | Gray | |
| 4,983,085 | A | | 1/1991 | Gray | |
| 4,995,652 | A | | 2/1991 | Mugnolo et al. | |
| 5,104,274 | A | * | 4/1992 | Omori | 411/374 |
| 5,193,956 | A | * | 3/1993 | Duran | 411/33 |
| 5,520,300 | A | | 5/1996 | Griffin | |
| 5,690,290 | A | * | 11/1997 | Asano et al. | 242/283 |
| 5,762,560 | A | | 6/1998 | Emmett et al. | |

(Continued)

*Primary Examiner*—Victor Batson
*Assistant Examiner*—Roberta Delisle
(74) *Attorney, Agent, or Firm*—Adams Intellectual Property Law (57) ABSTRACT

A fastener system for retaining a loose elongate fastener in a counterbore, including an elongate fastener, such as a bolt, having a head for being received and retained in a counterbore in a structure and in generally flush relation to a surface of the structure surrounding the counterbore, and a retaining member for being secured to the structure proximate the counterbore and overlapping the counterbore to trap the loose fastener in the counterbore.

12 Claims, 10 Drawing Sheets

U.S. PATENT DOCUMENTS

| | | |
|---|---|---|
| 6,010,289 A | 1/2000 | DiStasio et al. |
| 6,048,151 A * | 4/2000 | Kwee ......................... 411/217 |
| 6,073,792 A | 6/2000 | Campbell et al. |
| 6,698,853 B2 | 3/2004 | Chen et al. |
| 6,715,185 B2 * | 4/2004 | Angellotti .................... 24/297 |
| 6,881,015 B2 | 4/2005 | Wallstein et al. |
| 6,905,297 B2 | 6/2005 | DiStasio et al. |
| 7,008,158 B2 | 3/2006 | Madden, III |
| 2005/0100424 A1 | 5/2005 | DiStasio et al. |

* cited by examiner

FASTENER SYSTEM, FASTENER SYSTEM ARTICLE, AND METHOD

TECHNICAL FIELD AND BACKGROUND OF THE INVENTION

This invention relates to a fastener system, fastener system article such as a bolt, and a method of retaining a loose elongate fastener in a counterbore. In many industrial applications large bolts are used to releasably connect machinery parts together. The bolts may be deliberately positioned in holes that are oversized in relation to the diameter of the bolt shank, and with a counterbore that is oversized in relation to the size of the bolt head. This may be done for a number of reasons that include the desire to prevent impact shock applied directly to the bolt through the machine part, to allow easy bolt removal when desired, and to facilitate minute degrees of adjustment to the machine parts before the nut is tightened. In many such cases the counterbore is oversized to a sufficient degree to allow easy removal of the bolt, but is small enough to prevent more than a minimal degree of rotation. For example, with a hex-head bolt positioned in an oversized hex-shaped counterbore, the bolt may be allowed to rotate between 5-25 degrees, but not enough to allow a corner of the bolt head to pass a corner of the counterbore. This is desirable in order to permit the nut to be applied to and removed from the bolt without capturing the head with a wrench or similar tool to prevent rotation.

When repair, adjustment or replacement is required, the nut is removed from the bolt in order to separate the connected parts. When the bolt is captured and retained in the bolt hole by the nut instead of by mating threads on the bolt and the interior of the bolt hole, the bolt is susceptible to inadvertently exiting the bolt hole, either by an impact on the shank along the axis of the bolt, or by the bolt failing out of the bolt hole when the part is inverted. In such cases, the failing bolt may strike and injure a nearby worker, damage nearby machinery or be itself damaged.

As noted above, these fasteners are often recessed in counterbores. A "counterbore" can refer to a cylindrical flat-bottomed hole which enlarges another hole such as a through or blind bolt hole, or the tool used to create that feature. The term is usually used when a bolt or cap head screw is required to sit flush with or below the level of a workpiece or machine part surface. By comparison, a countersink refers to a conical hole used to seat a flathead screw. A very shallow counterbore, such as one machined on a cast part to provide a flat surface for a fastener head, may also be called a "spotface." For purposes of this application, the term "counterbore" is used in a generic sense to refer to all of these specific structures, in order to avoid repetition and frequent use of alternative terms.

Therefore, there exists a need for a simple, effective and inexpensive way of retaining a bolt or similar fastener in a bolt hole that includes a counterbore, when the bolt or similar fastener is loosely positioned in the hole and not retained by a nut or similar element.

It is an object of the invention to provide a simple, effective and inexpensive way of retaining a bolt or similar fastener in a bolt hole.

These and other objects and advantages of the invention are achieved by providing a fastener system for retaining a loose elongate fastener in a counterbore, comprising an elongate fastener having a head for being received and retained in a counterbore in a structure and in generally flush relation to a surface of the structure surrounding the counterbore, and a retaining member for being secured to the structure proximate the counterbore and overlapping the counterbore to trap the loose fastener in the counterbore.

According to another embodiment of the invention, the head of the elongate fastener is polygonal and the counterbore is sized to permit limited rotation of the head.

According to yet another embodiment of the invention, the head of the fastener defines a first recess therein communicating with an edge thereof. A second recess is formed in the structure and communicates with the counterbore for being aligned with the first recess. The retaining member is adapted for being positioned in the aligned first and second recesses to trap the loose fastener in the counterbore.

According to yet another embodiment of the invention, the fastener comprises a bolt having an enlarged polygonal head and a threadless shank portion extending from the head and a threaded shank portion distal from the head.

According to yet another embodiment of the invention, the retaining member is retained in the recess by a screw threaded into a hole in the structure within the recess.

According to yet another embodiment of the invention, the retaining member substantially covers the counterbore.

According to yet another embodiment of the invention, the retaining member is retained in position over the counterbore by at least one screw extending through the retaining member and secured to the structure within the counterbore.

According to yet another embodiment of the invention, the retaining member comprises a bar extending across the counterbore and fastened to the structure on generally opposing sides thereof.

According to yet another embodiment of the invention, the retaining member comprises a bar extending across the counterbore and fastened to the structure on generally opposing sides thereof, and an inwardly-extending portion for engaging the head to prevent rotation thereof in the counterbore.

According to yet another embodiment of the invention, a fastener system is provided for retaining a loose elongate fastener in a counterbore, and comprises a bolt having a polygonal head for being received and retained in a counterbore in a structure and in generally flush relation to a surface of the structure surrounding the counterbore. The head of the bolt defines a first recess therein for communicating with an edge thereof, and a second recess formed in the structure and communicating with the counterbore for being aligned with the first recess. A retaining member is adapted for being positioned in the aligned first and second recesses to trap the loose bolt in the counterbore.

According to yet another embodiment of the invention, a method of retaining a loose elongate fastener in a counterbore is provided, and comprises the steps of providing an elongate fastener having a head for being received and retained in a counterbore in a structure in generally flush relation to a surface of the structure surrounding the counterbore, and a retaining member for being secured to the structure proximate the counterbore and overlapping the counterbore to trap the loose fastener in the counterbore. The fastener is positioned in the counterbore and the retaining member is positioned in overlapping relation to the head of the fastener. The retaining member is secured to the structure.

According to yet another embodiment of the invention, the method includes the steps of providing a first recess in the head of the fastener and communicating with an edge thereof, and a second recess formed in the structure and communicating with the counterbore for being aligned with the first recess.

According to yet another embodiment of the invention, the method includes the step of positioning the retaining member in the aligned first and second recesses to trap the loose fastener in the counterbore.

According to yet another embodiment of the invention, the method includes the step of retaining the retaining member in the recess by a screw threaded into a hole in the structure within the recess.

According to yet another embodiment of the invention, the method includes the step of substantially covering the counterbore with the retaining member.

According to yet another embodiment of the invention, the method includes the step of retaining the retaining member in position over the counterbore by at least one screw extending through the retaining member and secured to the structure within the counterbore.

According to yet another embodiment of the invention, the method includes the step of retaining the retaining member comprises the steps of positioning a bar across the counterbore and fastening the bar to the structure on generally opposing sides of the counterbore.

According to yet another embodiment of the invention, wherein the step of retaining the retaining member includes the steps of positioning a bar having an inwardly-extending portion for engaging the head to prevent rotation thereof in the counterbore across the counterbore, and fastening the bar to the structure on generally opposing sides.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENTS AND BEST MODE

Figure 1:
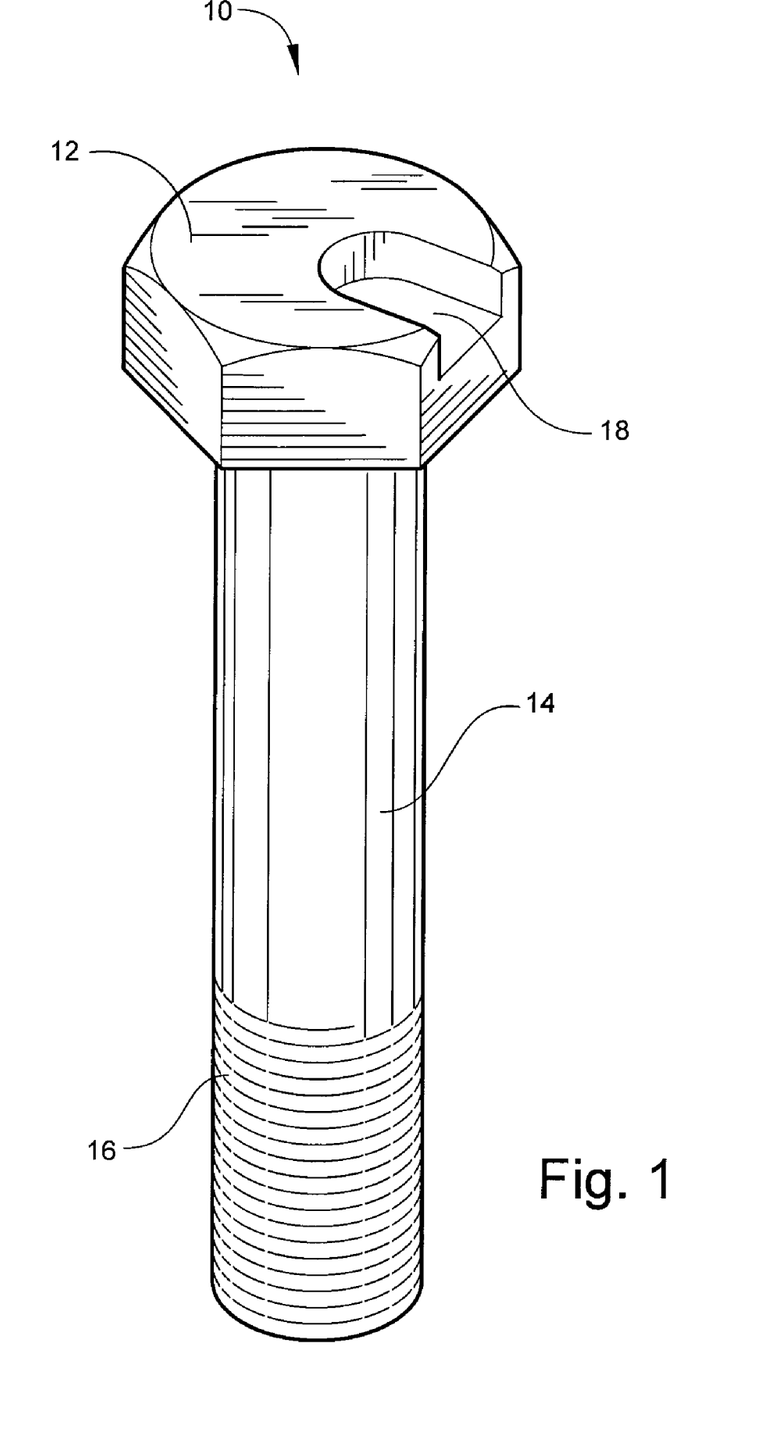
FIG. 1 is a perspective view of a bolt according to an embodiment of the invention.

Referring now specifically to the drawings, a bolt according to the present invention is shown generally in FIG. 1 at reference numeral 10. The bolt 10 includes a bolt head 12, such as a hex head, a threadless shank portion 14 extending outwardly from the head 12, and a distal threaded portion 16. The bolt head 12 also includes a recess 18 that extends to and communicates with the edge of the bolt head 12. This bolt 12 is exemplary of many variations of bolts and other elongate fasteners that have application to this invention. Preferably, the recess 18 does not extend the entire depth of the bolt head 12.

Figure 2:
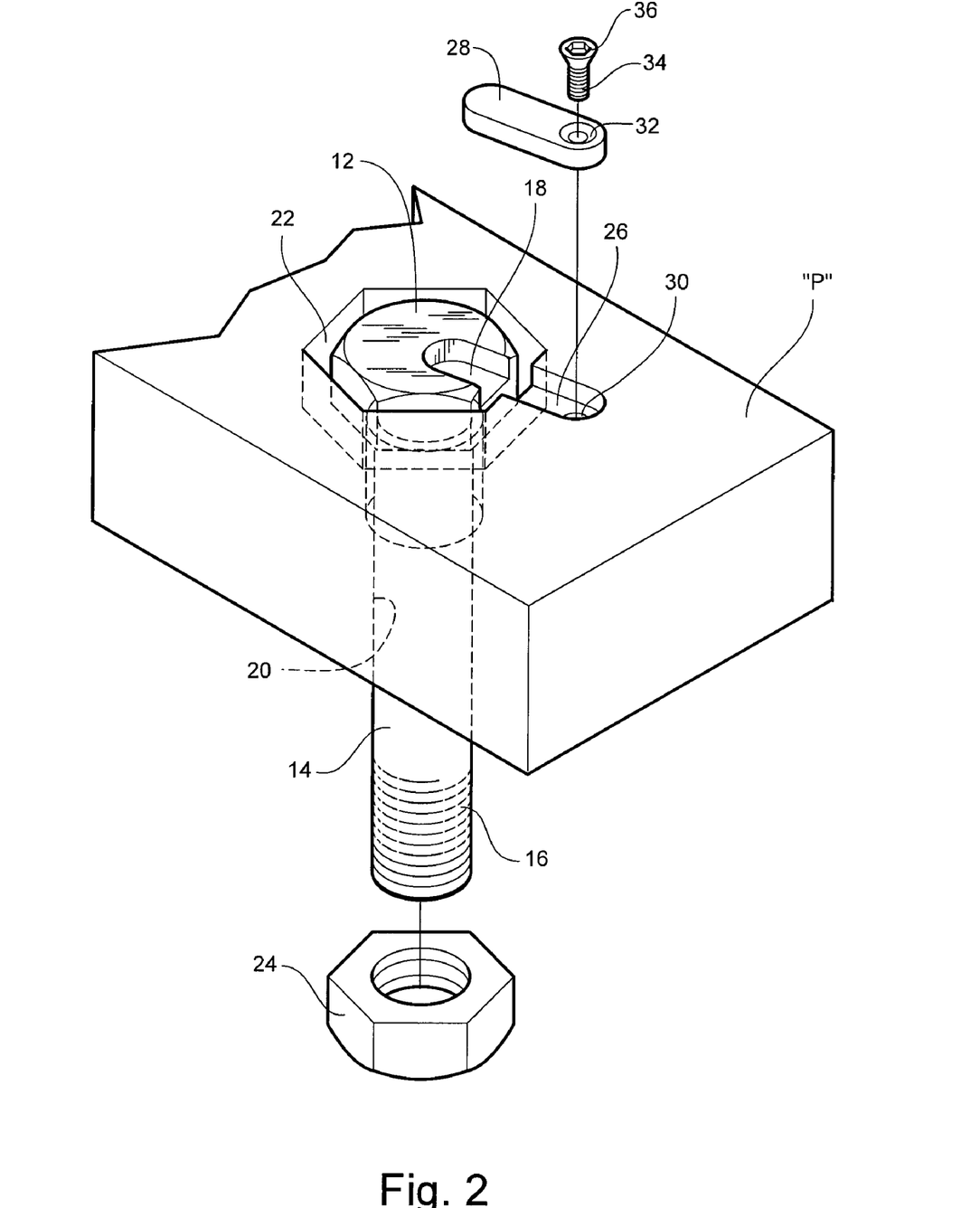
FIG. 2 is an exploded perspective view of the bolt and related surrounding structure.
Figure 3:
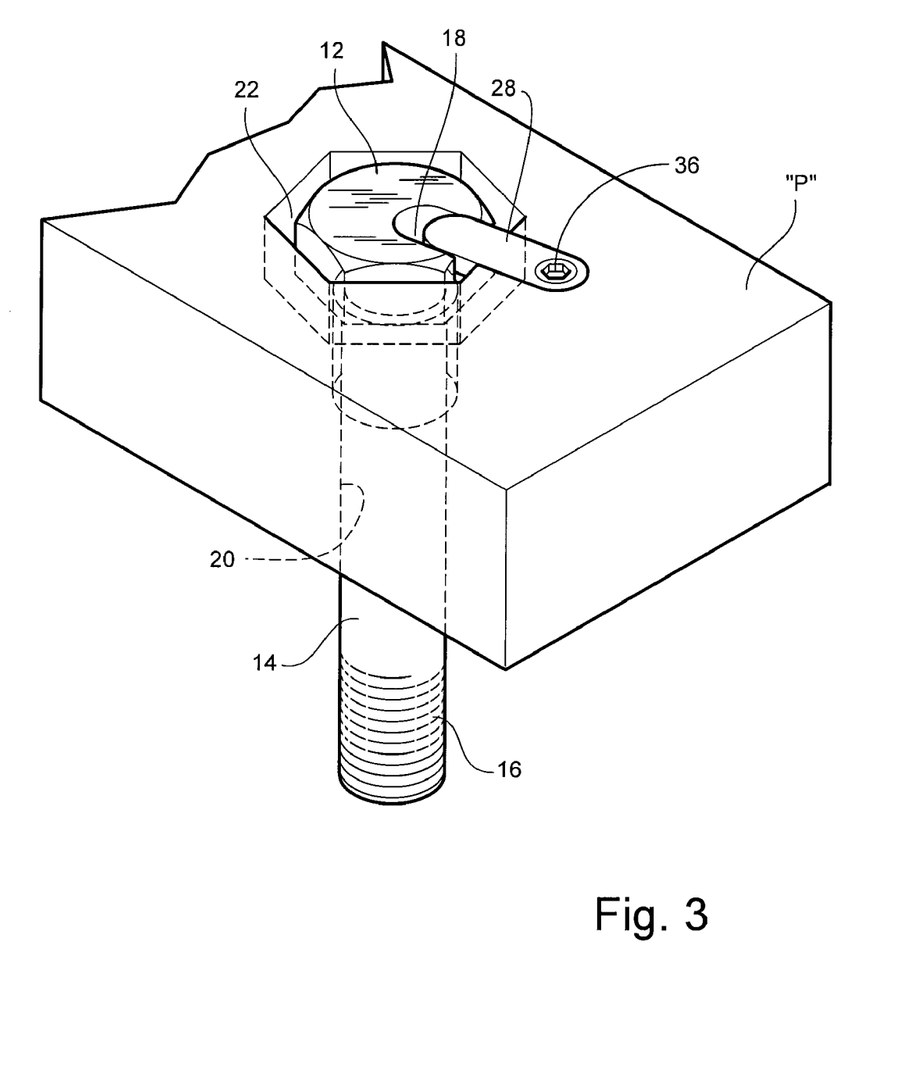
FIG. 3 is a perspective view of the bolt and related surrounding structure.

Referring now to FIGS. 2 and 3, the bolt 10 is shown positioned in an oversized bolt hole 20 and an oversized counterbore 22 in a part "P". The counterbore 22 is sufficiently large to allow easy removal of the bolt 12 when not captured in the bolt hole 20 by, for example, a nut 24. The bolt head 12 is flush with or slightly below the level of the surrounding surface of the part "P". The part "P" includes a recess 26 that communicates with the counterbore 22. To retain the bolt 10 in the counterbore 22, the recesses 18 and 26 are aligned, as shown in FIG. 2. A bar 28, which may be formed of metal, plastic or any other suitable material, is positioned in the aligned recesses 18 and 26. The recess 26 includes a threaded hole 30 that aligns with a hole 32 in the bar 28. A small flathead screw 34 with, for example, an internal Allen head recess 36, is screwed into the hole 32. When fully inserted, the screw 34 and the bar 28 both reside flush with or slightly below the surrounding surface of the part "P."

Preferably, the perimeter of the bar 28 is slightly smaller than the recess 18 in the bolt head 12 so that the looseness of the bolt 10 in the bolt hole 20 and counterbore 22 is maintained. The bolt 10 can be quickly removed by removing the bar 28.

The above discussion is intended to be illustrative of many variations that are within the scope of the invention. Several other alternative embodiments are shown in FIGS. 4, 5, 6, 7, 8 and 9-10.

Figure 4:
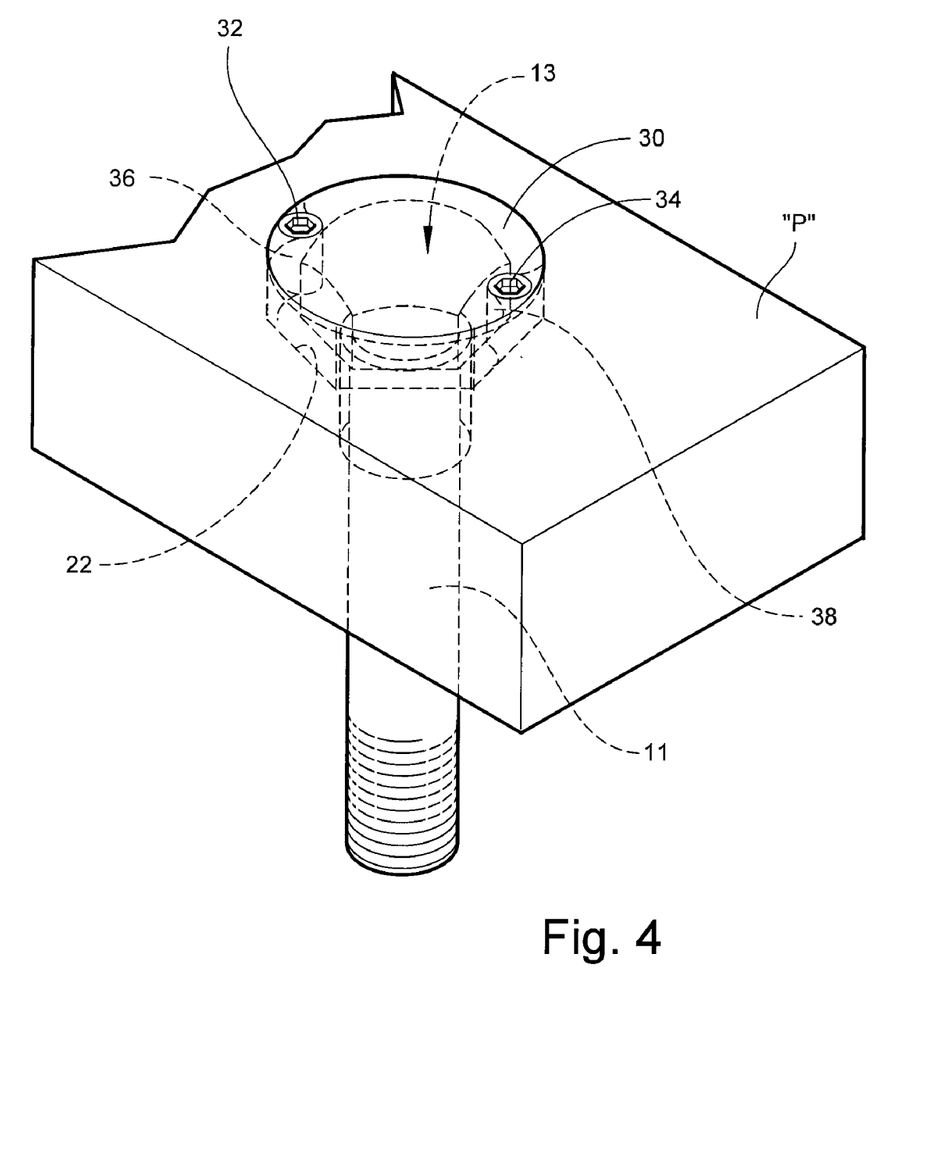
FIG. 4 is a perspective view of an alternative fastener system according to the invention.

In FIG. 4, for example, where like reference numerals indicate like elements, a small cover 30 is adapted to fit into the counterbore 22 and lie flush or slightly below flush with the surrounding surface of the part "P." A pair of screws 32, 34 extend through screw holes in the cover 30 and are threaded into small threaded holes 36, 38 in the bottom of the counterbore 22. The bolt 11 and bolt head 13 are therefore captured in the counterbore 22 in a manner similar to that described above.

Figure 5:
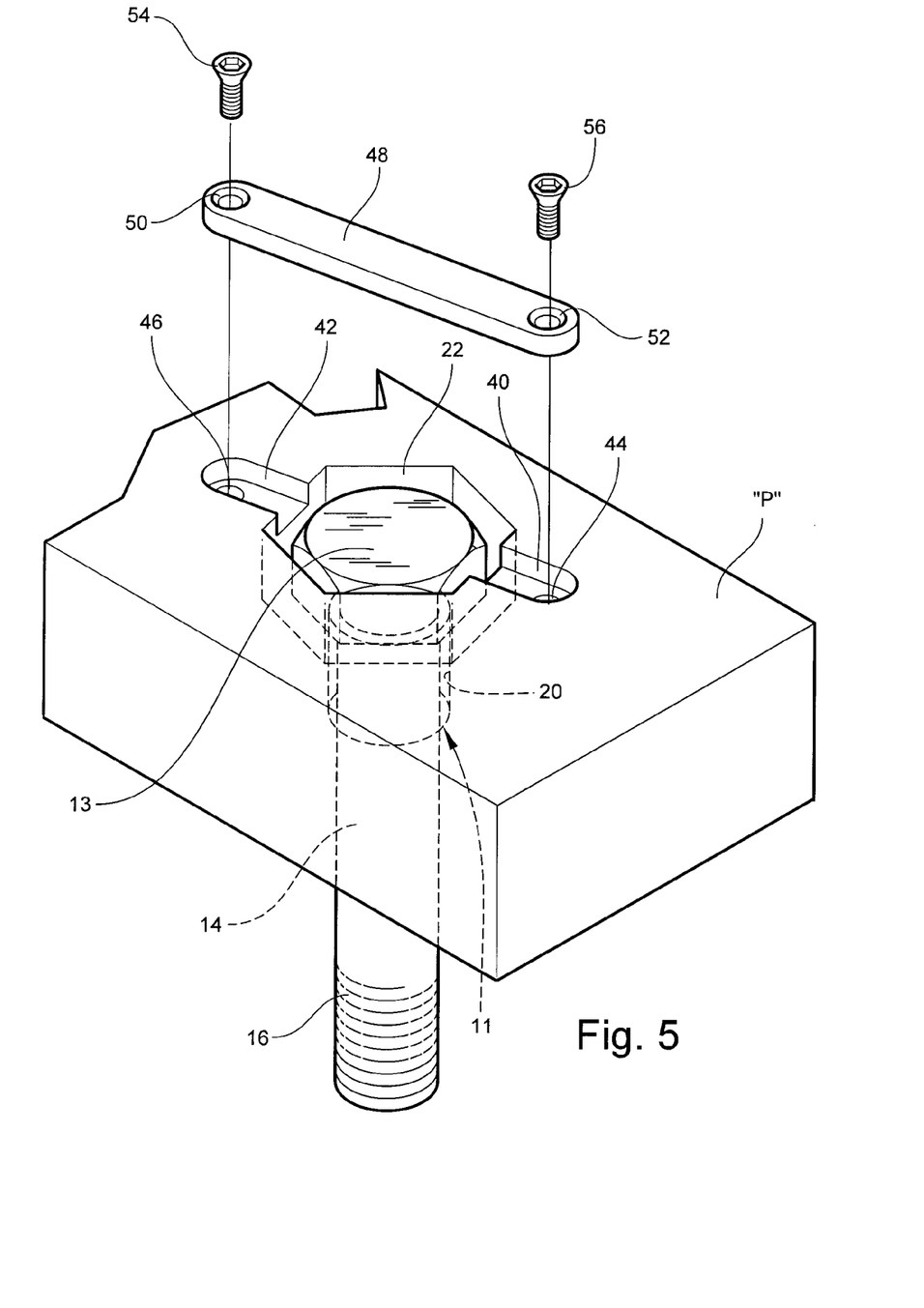
FIG. 5 is a perspective view of a further alternative fastener system according to the invention.

Referring now to FIG. 5, a pair of opposed, axially-aligned recesses 40, 42 in part "P" communicate with the counterbore 22. The bolt head 13 is sufficiently below the surrounding surface of part "P" that a thin bar 48 can be positioned in the recesses 40, 42, extend across the width of the counterbore 22 to trap the bolt head 13 in the counterbore 22, and still provide minimal clearance to the bolt head 13 while being flush or slightly below the level of the part "P". Screw holes 44, 46 in the recesses 40, 42 align with holes 50, 52 in the bar 48 and receive screws 54, 56.

Figure 6:
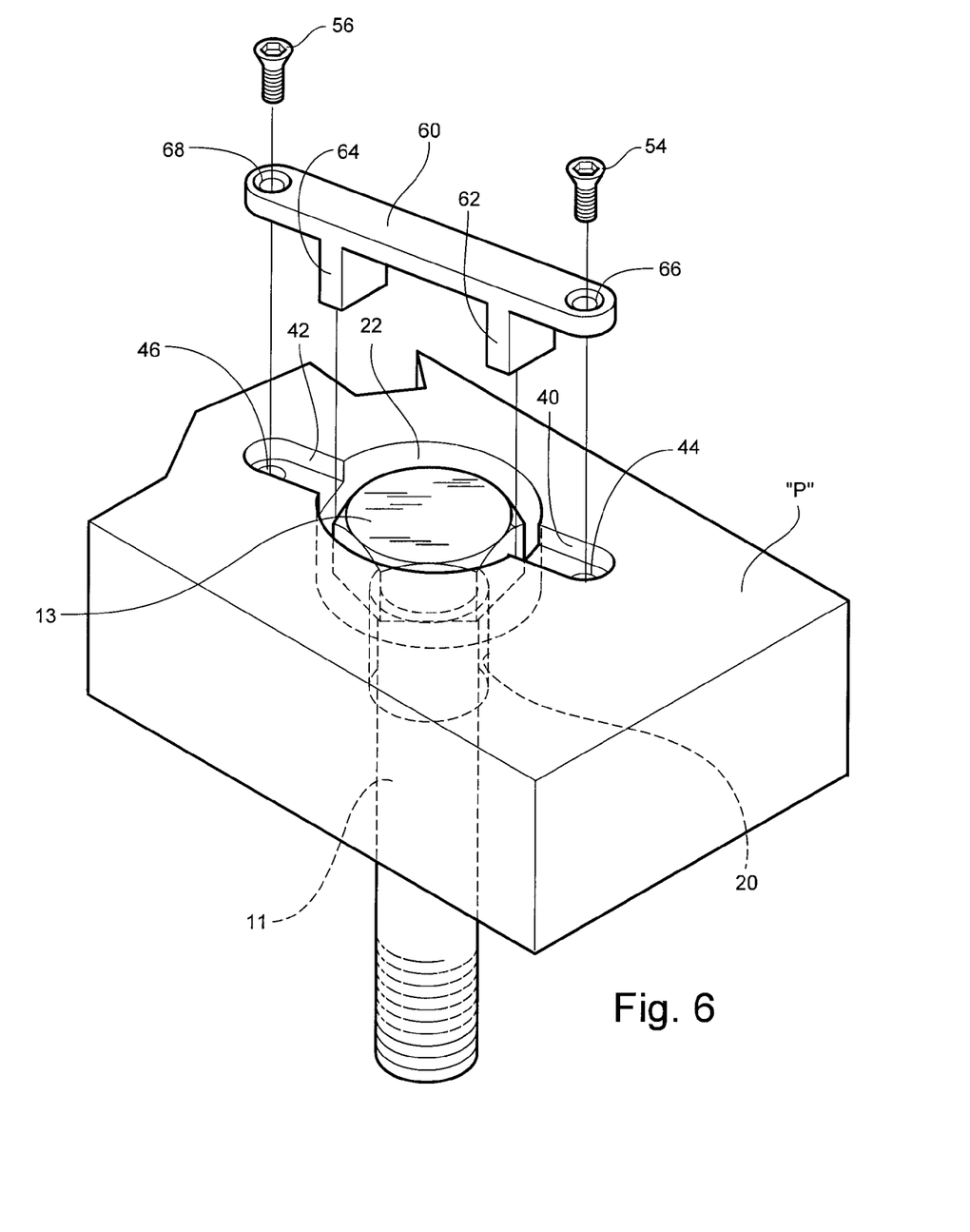
FIG. 6 is a perspective view of a still further alternative fastener system according to the invention.

Referring now to FIG. 6, yet another variation is illustrated to take into account situations where the user desires the option of either allowing the bolt 11 to rotate in the counterbore 22 or to prevent bolt 11 rotation. When rotation of bolt 11 is to be prevented, a bar 60 is utilized that includes a pair of downwardly-extending tabs 62, 64 that wedge between the bolt head 13 and the adjacent wall of the counterbore 22 to prevent rotation of the bolt head 13 while the bar 60 is in place. Screw holes 44, 46 in the recesses 40, 42 align with holes 66, 68 in the bar 60 and receive the screws 54, 56 to hold the bar 60 in place.

Figure 7:
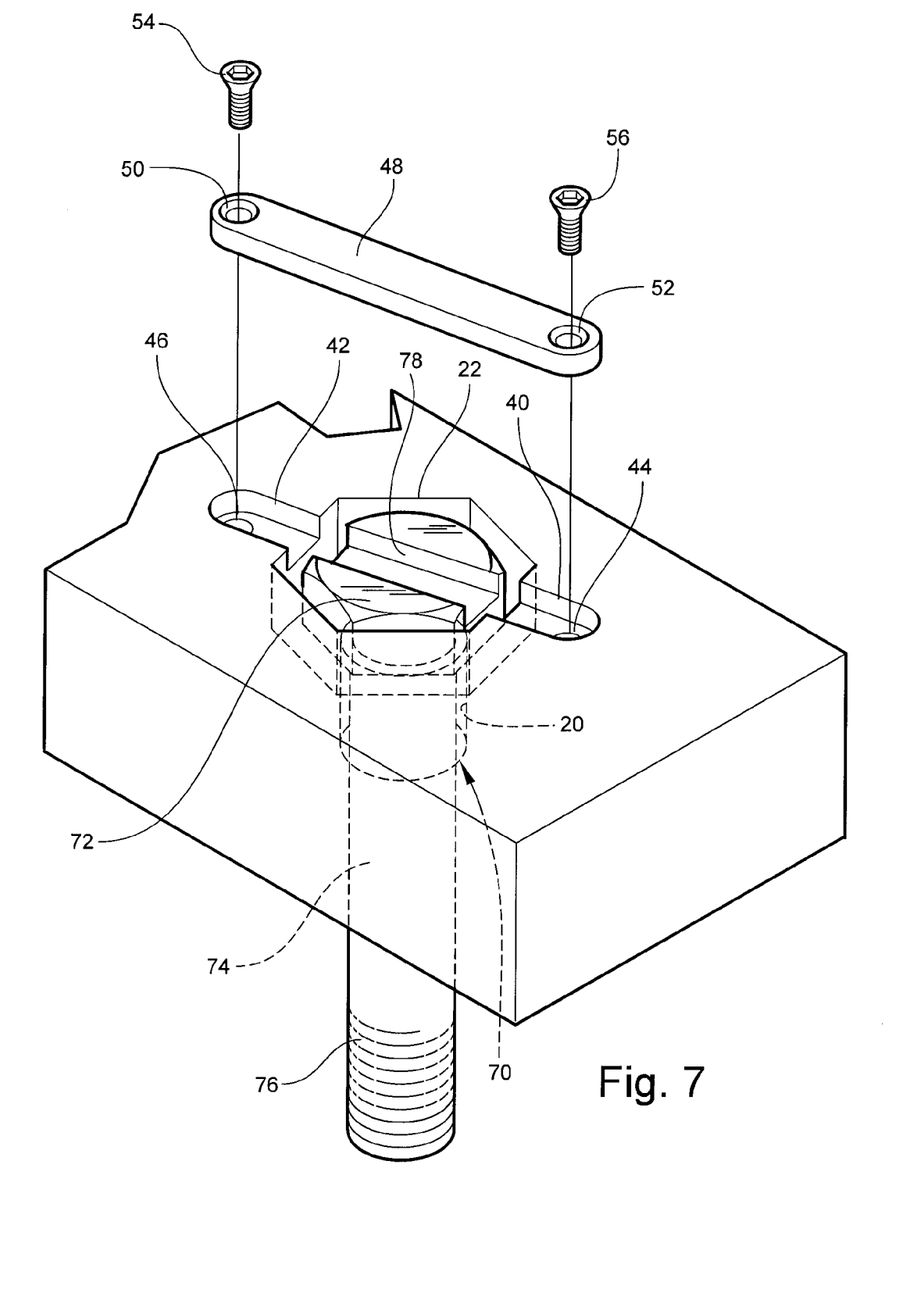
FIG. 7 is a perspective view of a still further alternative fastener system according to the invention.

Referring now to FIG. 7, a variation of the system shown in FIG. 5 is shown, wherein a bolt 70 having a bolt head 72, a shank 74 and a threaded portion 76 is positioned in the counterbore 22, but with the bolt head 72 generally flush or just below flush with the part "P". The bolt head 72 is provided with a diametrical slot 78 that can be aligned with the recesses 40, 42. Screw holes 44, 46 in the recesses 40, 42 align with holes 50, 52 in the bar 48 and receive screws 54, 56.

Figure 8:
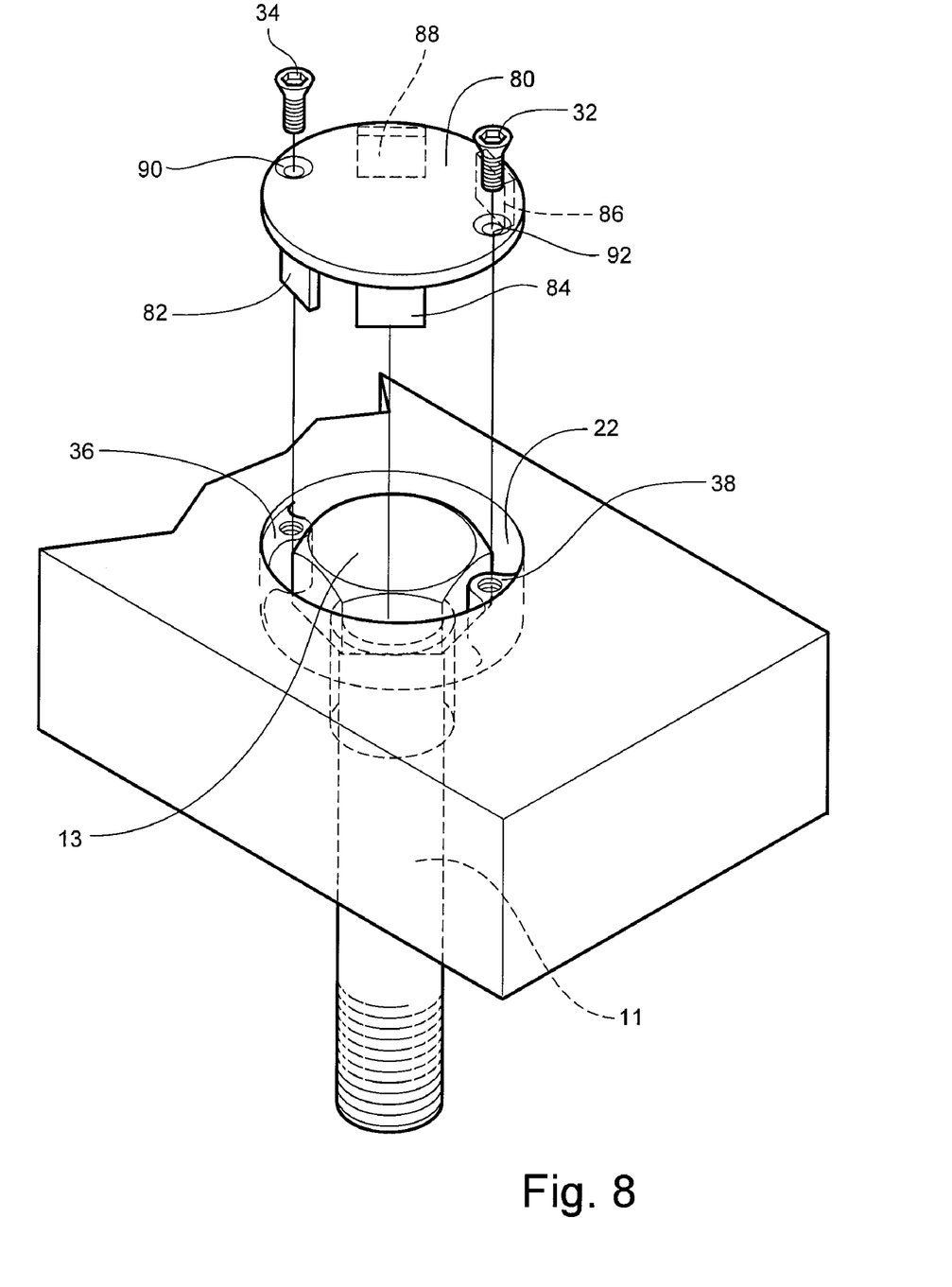
FIG. 8 is a perspective view of a still further alternative fastener system according to the invention.

Referring now to FIG. 8, a variation on the systems shown in FIGS. 4 and 6 is illustrated, where like reference numerals indicate like elements. A small cover 80 is adapted to fit into the counterbore 22 and lie flush or slightly below flush with the surrounding surface of part "B". A pair of screws 32, 34 extend through screw holes 90, 92 in the cover 30 and are threaded into threaded holes 36, 38 in the counterbore 22. The cover 80 includes on its underside a plurality of downwardly-extending tabs 82, 84, 86, 88 that wedge between the bolt head 13 and the sidewalls of the counterbore 22. The bolt head 13 is therefore captured in the counterbore 22 in a manner similar to that described above, and the bolt 11 is prevented from both rotating and failing from the counterbore 22 when inverted.

Figure 9:
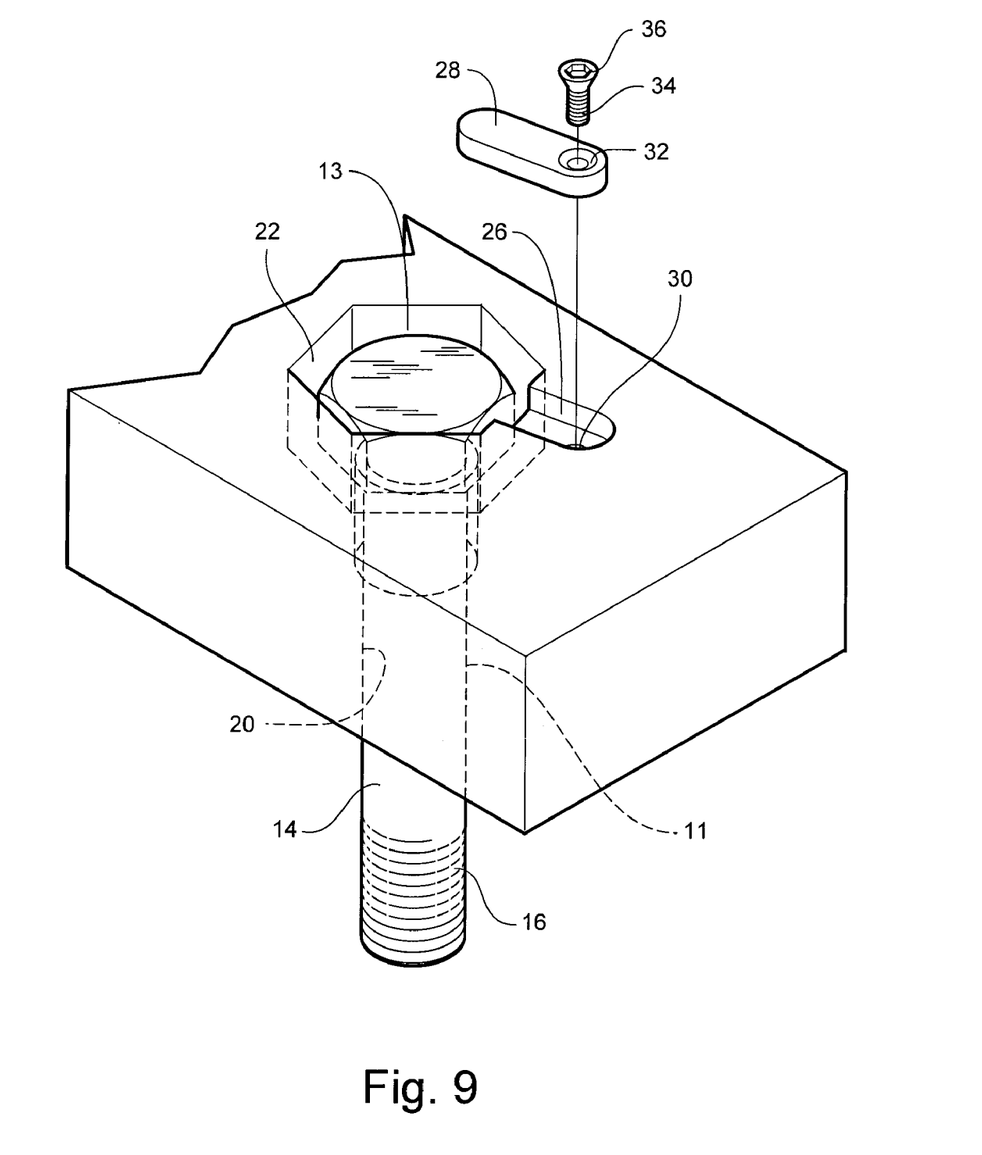
FIG. 9 is an exploded perspective view of a still further alternative fastener system according to the invention.
Figure 10:
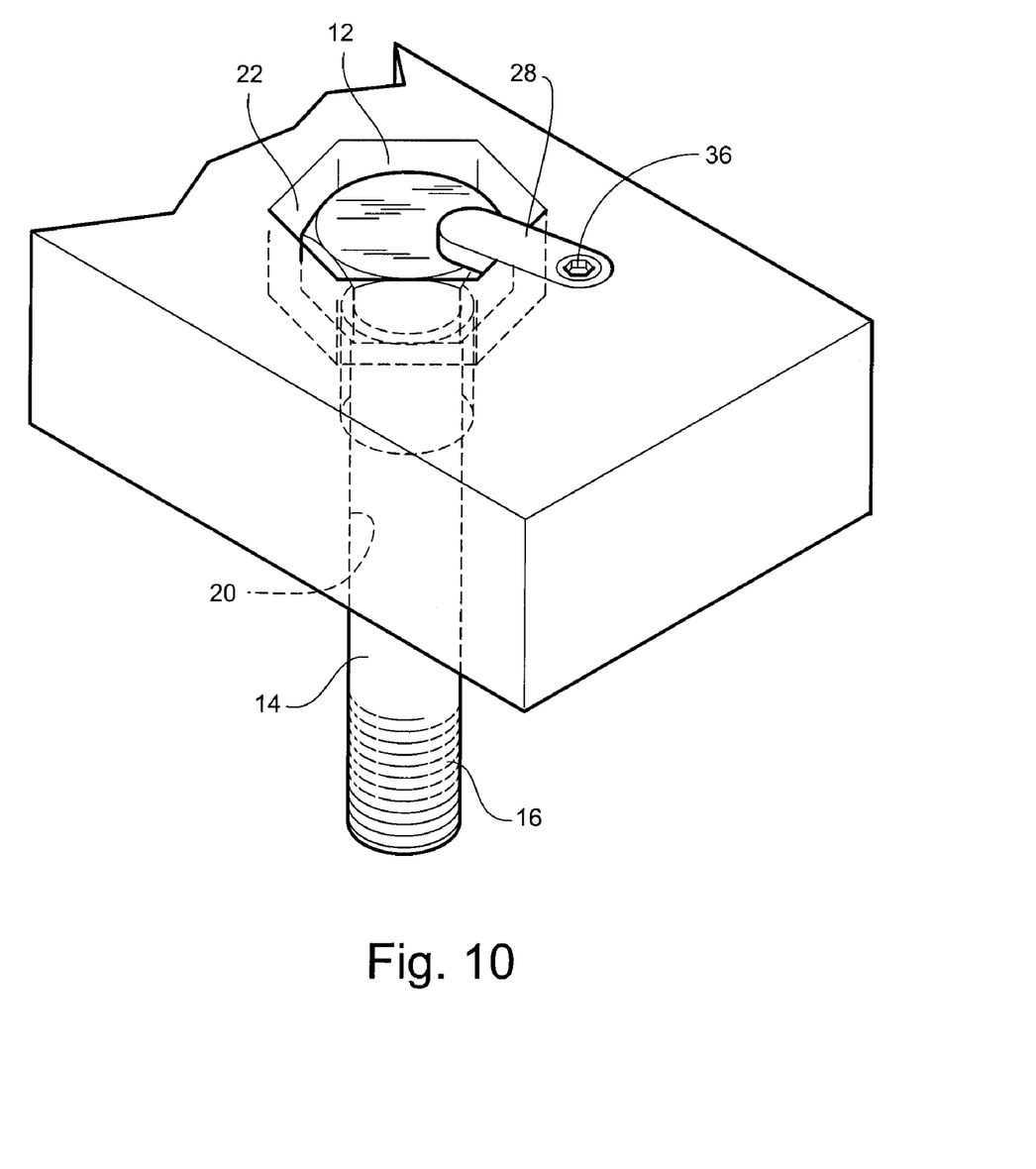
FIG. 10 a perspective view of the fastener system shown in FIG. 9.

A still further iteration is shown in FIGS. 9 and 10, where the the bolt 11 is shown positioned in an oversized bolt hole 20 and oversized counterbore 22. The bolt head 13 is recessed to set below flush with the surrounding surface of part "P." The surrounding surface includes a recess 26 that communicates with the counterbore 22. To retain the bolt 11 in the counterbore 22, the bar 28, as is also shown in FIG. 2, is positioned in the recess 26 and extends out over the recessed bolt head 13, thus trapping the bolt head 13 in the counterbore 22. In this configuration, the bolt 11 may be allowed to rotate or be prevented from rotating, depending on the difference in the diameter of the bolt head 13 and the counterbore 22. The recess 26 includes a threaded hole 30 that aligns with a hole 32 in the bar 28, and a flathead screw 34 with, for example, an internal Allen head recess 36, is screwed into the hole 32. When fully inserted, the screw 34 and the bar 28 both reside flush with or slightly below the surrounding surface and in locked position over the bolt head 13.

Preferably, the perimeter of the bar 28 is slightly smaller than the perimeter of the adjacent portion of the recess 26 so that the looseness of the bolt head 13 in the counterbore 22 is maintained even though the bolt 11 cannot be removed without first removing the bar 28. The bolt 11 can be quickly removed by removing the bar 28.

A fastener system, fastener system article such as a bolt, and a method of retaining a loose elongate fastener in a counterbore are described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

I claim:

1. A fastener system for retaining an elongate fastener in a counterbore, comprising:
   (a) a structure having a surface, a bore hole, a counterbore defined in the surface around the bore hole, a threaded hole parallel to and spaced from the bore hole, and a recess defined in the surface around the threaded hole, the recess adjacent to and communicating with the counterbore;
   (b) an elongate fastener having a shank positioned in the bore hole, an enlarged head attached to the shank and positioned in the counterbore, and a recess defined in the head and aligned with the recess defined in the surface of the structure;
   (c) a retaining member at least partially overlapping both the recess defined in the surface of the structure and the recess defined in the head of the fastener, the retaining member having a hole defined therethrough; and
   (d) a threaded connector extended through the hole defined through the retaining member and threaded into the threaded hole of the structure, the threaded connector having a head attaching the retaining member to the structure such that the retaining member retains the head of the fastener within the counterbore.

2. A fastener system according to claim 1, wherein the head of the elongate fastener is polygonal and the counterbore is shaped to prevent rotation of the head.

3. A fastener system according to claim 1, wherein the fastener comprises a bolt having an enlarged polygonal head, a threadless shank portion extending from the head and a threaded shank portion distal from the head.

4. A fastener system according to claim 1, wherein the retaining member substantially covers the counterbore.

5. A fastener system according to claim 4, wherein the retaining member is retained in position over the counterbore by at least one screw extending through the retaining member and being secured to the structure within the counterbore.

6. A fastener system according to claim 1, wherein the retaining member comprises a bar extending across the counterbore and fastened to the structure on generally opposing sides thereof.

7. A fastener system according to claim 1, wherein the retaining member comprises a bar extending across the counterbore and fastened to the structure on generally opposing sides thereof, and including an inwardly-extending portion for engaging the head to prevent rotation thereof in the counterbore.

8. A fastener system for retaining a bolt in a counterbore, comprising:
   (a) a structure having a surface, a bore hole, a counterbore defined in the surface around the bore hole, a threaded hole parallel to and spaced from the bore hole, and a recess defined in the surface around the threaded hole, the recess adjacent to and communicating with the counterbore;
   (b) a bolt having a shank positioned in the bore hole, an enlarged head attached to the shank and positioned in the counterbore flush with the surface of the structure, and a recess defined in the head and aligned with the recess defined in the surface of the structure;
   (c) a retaining member at least partially overlapping both the recess defined in the surface of the structure and the recess defined in the head of the bolt, the retaining member having a hole defined therethrough; and
   (d) a threaded connector extended through the hole defined through the retaining member and threaded into the threaded hole of the structure, the threaded connector having a head attaching the retaining member to the structure such that the retaining member retains the head of the bolt within the counterbore.

9. A fastener system according to claim 8, wherein the bolt has a threadless shank portion extending from the head and a threaded shank portion distal from the head.

10. A method of retaining an elongate fastener in a counterbore, comprising the steps of:
   (a) providing a structure having a surface, a bore hole, a counterbore defined in the surface around the bore hole, a threaded hole parallel to and spaced from the bore hole, and a recess defined in the surface around the threaded hole, the recess adjacent to and communicating with the counterbore;
   (b) providing an elongate fastener having a shank, an enlarged head attached to the shank, and a recess defined in the head;
   (c) positioning the shank of the fastener in the bore hole and the head of the fastener in the counterbore with the recess defined in the head aligned with the recess defined in the surface of the structure;

(d) providing a retaining member having a hole defined therethrough;

(e) placing the retaining member into a position at least partially overlapping both the recess defined in the surface of the structure and the recess defined in the head of the fastener; and (f) retaining the head of the fastener within the counterbore by extending a threaded connector through the hole defined through the retaining member and threading the threaded connector into the threaded hole of the structure such that a head of the threaded connector attaches the retaining member to the structure.

11. A method according to claim 10, and including the step of substantially covering the counterbore with the retaining member.

12. A method according to claim 10, wherein the step of placing the retaining member comprises extending the retaining member across the counterbore, and wherein the step of retaining the head of the fastener within the counterbore comprises fastening the retaining member to the structure on generally opposing sides of the counterbore.

* * * * *